United States Patent
Jackson (10) Patent No.: US 8,117,313 B2
(45) Date of Patent: Feb. 14, 2012

(54) SYSTEM AND METHOD FOR ADAPTIVE FORMATTING OF IMAGE INFORMATION FOR EFFICIENT DELIVERY AND PRESENTATION

(75) Inventor: Jared J. Jackson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2699 days.

(21) Appl. No.: 09/812,872

(22) Filed: Mar. 19, 2001

(65) Prior Publication Data

US 2002/0131072 A1    Sep. 19, 2002

(51) Int. Cl.
*G06F 15/16* (2006.01)

(52) U.S. Cl. .......................................... 709/227; 709/203

(58) Field of Classification Search .......... 709/200–207, 709/217–228, 246, 212, 247; 382/250, 280
See application file for complete search history.

(56) References Cited

U.S. PATENT DOCUMENTS

| | | | |
|---|---|---|---|
| 5,138,459 A | 8/1992 | Roberts et al. | |
| 5,448,307 A | 9/1995 | Gelissen et al. | |
| 5,600,572 A | 2/1997 | Kerdranvat et al. | |
| 5,708,826 A | 1/1998 | Ikeda et al. | |
| 5,805,228 A | 9/1998 | Proctor et al. | |
| 5,815,411 A * | 9/1998 | Ellenby et al. ................. 702/150 |
| 5,831,678 A | 11/1998 | Proctor | |
| 5,848,415 A | 12/1998 | Guck | |
| 5,864,681 A | 1/1999 | Proctor et al. | |
| 5,914,787 A | 6/1999 | Satoh et al. | |
| 5,983,236 A * | 11/1999 | Yager et al. ................. 707/104.1 |
| 6,006,231 A | 12/1999 | Popa | |
| 6,061,696 A | 5/2000 | Lee et al. | |
| 6,091,778 A | 7/2000 | Sporer et al. | |
| 6,100,888 A * | 8/2000 | Gourdol et al. ................ 715/837 |
| 6,111,662 A * | 8/2000 | Satoh et al. ................... 358/442 |
| 6,137,441 A * | 10/2000 | Dai et al. ................. 342/357.16 |
| 6,167,441 A * | 12/2000 | Himmel ........................ 709/217 |
| 6,300,947 B1 * | 10/2001 | Kanevsky ...................... 715/866 |
| 6,412,008 B1 * | 6/2002 | Fields et al. ................... 709/228 |
| 6,421,733 B1 * | 7/2002 | Tso et al. ....................... 709/246 |
| 6,442,573 B1 * | 8/2002 | Schiller et al. ................ 715/210 |
| 6,563,800 B1 * | 5/2003 | Salo et al. ...................... 370/264 |
| 6,701,845 B2 * | 3/2004 | Ohmura ......................... 101/484 |

(Continued)

FOREIGN PATENT DOCUMENTS

JP    6125539    5/1994

(Continued)

*Primary Examiner* — Asad Nawaz
*Assistant Examiner* — Sargon Nano
(74) *Attorney, Agent, or Firm* — Jose Gutman; Fleit Gibbons Gutman Bongini & Bianco PL (57) ABSTRACT

A content server distributes image information to networked devices. The content server receives a request for delivery of information to a networked device, including image information. The content server determines, based on at least one of an image delivery parameter and an image presentation parameter associated with the networked device, an image format for the image information for delivery of the image information to the networked device and for presentation of the image information at the networked device. The content server sends a response to the networked device, responding to the request, the response comprising at least a portion of the image information in the image format. The image delivery parameter corresponds to at least one network communication link type and the image presentation parameter corresponds to at least one presentation platform type.

22 Claims, 9 Drawing Sheets

U.S. PATENT DOCUMENTS

| | | | |
|---|---|---|---|
| 6,748,294 B1 * | 6/2004 | Overman et al. | 700/224 |
| 6,779,040 B1 * | 8/2004 | Lee et al. | 709/247 |
| 7,069,332 B2 * | 6/2006 | Shibata et al. | 709/231 |
| 7,092,116 B2 * | 8/2006 | Calaway | 358/1.18 |
| 7,190,475 B2 * | 3/2007 | Nomoto | 358/1.15 |
| 7,234,160 B2 * | 6/2007 | Vogel et al. | 726/10 |
| 7,301,536 B2 * | 11/2007 | Ellenby et al. | 345/419 |
| 7,366,758 B2 * | 4/2008 | Kasatani | 709/206 |
| 2001/0010543 A1 * | 8/2001 | Ward et al. | 348/207 |
| 2002/0053078 A1 * | 5/2002 | Holtz et al. | 725/14 |
| 2004/0249806 A1 * | 12/2004 | Kanada | 707/3 |

FOREIGN PATENT DOCUMENTS

| | | |
|---|---|---|
| WO | WO 00/20985 | 4/2000 |

* cited by examiner

SYSTEM AND METHOD FOR ADAPTIVE FORMATTING OF IMAGE INFORMATION FOR EFFICIENT DELIVERY AND PRESENTATION

BACKGROUND OF THE INVENTION

1. Field of the Invention

This invention generally relates to the field of network image transfer, and more particularly relates to the transfer of optimized image information relative to a network communication capability and a requesting device presentation capability.

2. Description of Related Art

Image information communication is commonly handled through a heterogeneous network. Additionally, image serving via the Internet is regularly designed for reception by both wired and wireless networked devices.

In the case of wired devices the connection may be through a high bandwidth T-1 connection, DSL, Cable modem, or using a telephone connected modem. The connection speed ranges from megabits per second down to 14 Kbits per second or even lower.

The wireless devices may be a fully functional desktop workstation connected through a very high bandwidth satellite connection or at the other extreme a small cell phone with a very slow connection to the Internet.

Cutting across the connection speed is the connected devices processing power and display capability. The display can range from a very large engineering workstation down to a cell phone with only an alphanumeric display.

Client/Server topology allows for web servers to respond to a user's request for certain files. Given a GUI (Graphical User Interface) most of these files comprise image information. The user need not know esoteric program languages. With web browsers the user can simply point and click with a mouse.

For TV within certain standards such as NTSC, (National Television Standards Committee) the broadcasting industry assures that all NTSC standard TV sets will render the programming faithfully with respect to the video and audio. The TV set may be old and even black and white Vs color and with only one poor quality speaker. The size of the TV also does not matter. The viewer will see and hear a program that is faithful to the broadcast content.

Where as with computers and their use for browsing on the Internet, no such widely adopted standard exists. In particular computers that are connected to the Internet such as Intel/Microsoft based PCs, Mac, Web TV, internet appliances, PDAs (Personal Digital Assistant), and even cell phones all have widely different processing and imaging capabilities. Additionally, they are connected to the Internet, with very different speeds and qualities of connection. The Internet author must take into account both the visual quality and the time to send and render these images. That which will fill a small PDA screen in black and white will be very small when viewed on a large CRT connected to an engineering workstation. From the other point of view, a full-page image with millions of colors will not even display on a small PDA. Accordingly, the need exists for an image translation method that is aware of the device that requested the image and also of the interconnection speed.

Of particular importance is an entire new set of connected devices such as cell phones and PDAs. These devices have small displays with poor image processing capabilities. However the user is typically a mobile professional that expects high quality content that is timely and very legible, perhaps even in full sunlight. Accordingly the need exists for images to be convertible so as to communicate the sought for information within the confines of the connection speed, quality, processing and imaging capabilities of the requesting client. All this translation and selection should be accomplished in a timely fashion and with a reasonable cost at the server.

Typically, a user of the WWW (World Wide Web) wishing to share visual information must create an image in one format for distribution. Variations in network speed, browser functionality, and computer processor capabilities make limiting visual presentation over the WWW to one format undesirable.

Therefore a need exists to overcome the problems with the prior art as discussed above, and particularly for a certain class of images that contain not only visual information but also textual information.

Figure 1:
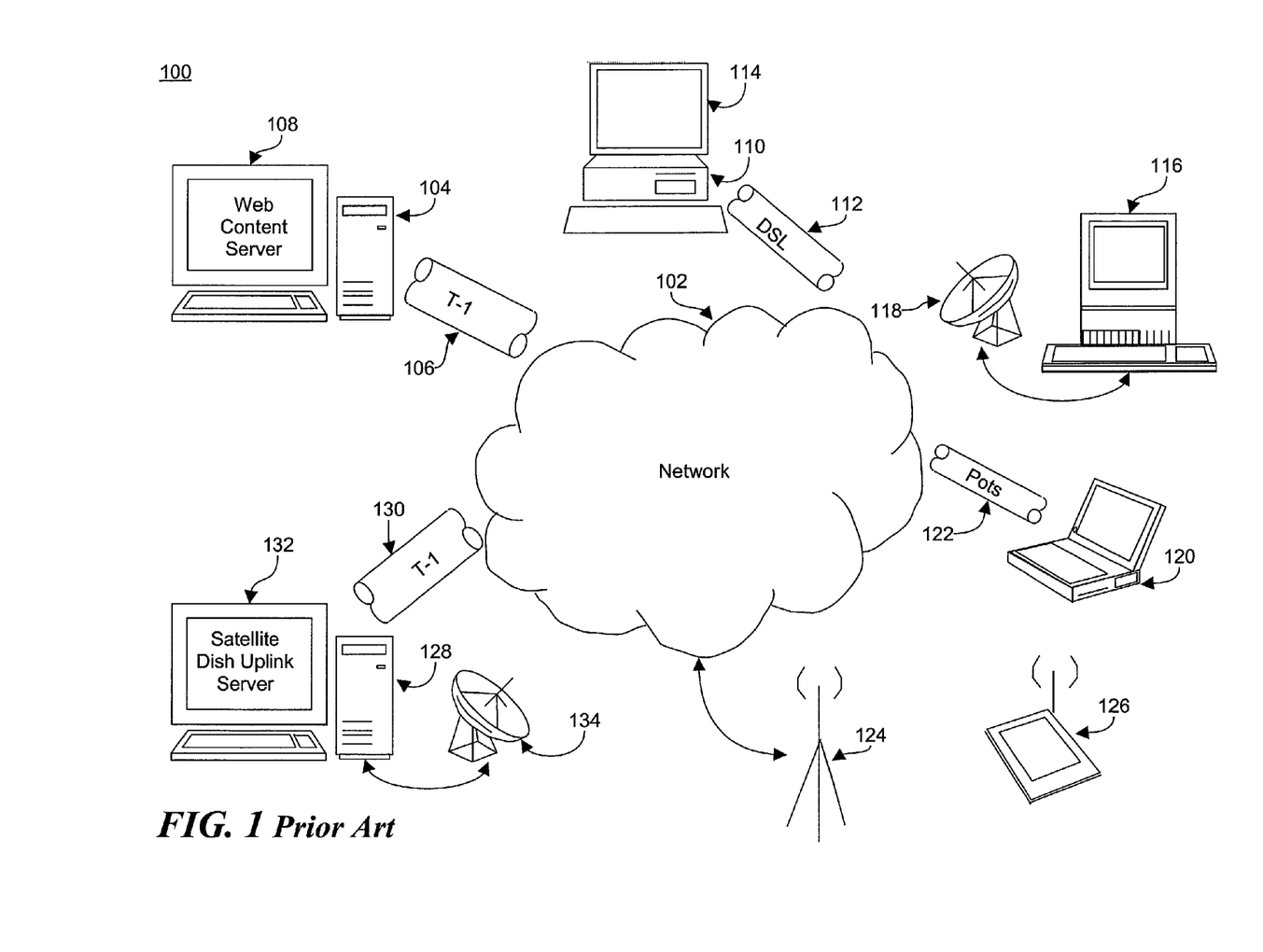
FIG. 1 is an ICON diagram illustrating an exemplary client server network content distribution topology in accordance with existing technology.

Illustrated in FIG. 1, is a block diagram 100, representing a diverse population of networked devices, such as found on the Internet. There is a web content server 104, which is connected to the network 102 with a high-speed connection known as a T-1 connection 106. This server is hosting information content, which contains at lease some graphical files 108.

There is a business grade workstation 110 connected to the network through a DSL connection 112. This station also has high-end graphic capabilities 114.

A high-speed satellite dish 118 is wirelessly connecting a Macintosh class Apple computer 116 to the network. This computer has a graphic capability that is non-Intel based.

The notebook PC 120 is connected to the network through a normal dial-up connection known as POTS 122 (Plain old Telephone System). The notebook's graphic capability is usually not as good as a normal desktop.

There is a cell tower connected to the network 124 (computer is not shown) that is wirelessly connected to a PDA 126. The connectivity and graphic capability for this device is very low, and yet the need for receiving timely information is usually very high.

Lastly, there is a satellite up-link server 128 that is connected to the network through a T-1 connection 130. This up-link server provides information to satellite subscribers by transmitting information to a satellite for re-broadcast back to earth. It has a high-end graphic platform 132.

It is noted that the speed and quality of the connections to the network varies greatly for the different devices. Additionally, the computer processing and graphic capability for these different machines have very different abilities. The rendering and viewing experiences for the different platforms are very different. Accordingly there is a need to serve the intended images across the Internet into these different platforms in an efficient and timely way.

SUMMARY OF THE INVENTION

According to a preferred embodiment of the present invention, a content distribution system receives a request for delivery of information to a networked device, the information comprising image information. The system determines, based on at least one of an image delivery parameter and an image presentation parameter associated with the networked device, an image format for the image information for delivery of the image information to the networked device and for presentation of the image information at the networked device. The system then provides a response for the request, the response comprising at least a portion of the image information in the image format.

According to a preferred embodiment of the present invention, a content server system comprises a first memory for storing at least one of an image delivery parameter and an image presentation parameter associated with a networked device, a network interface for communicating with a network, a controller, communicatively coupled to the first memory and to the network interface, and a second memory, communicatively coupled to the controller, for storing computer instructions for the controller to control the content server system to:

receive a request for delivery of information to a networked device, the information comprising image information;

determine, based on at least one of an image delivery parameter and an image presentation parameter associated with the networked device, an image format for the image information for delivery of the image information to the networked device and for presentation of the image information at the networked device, and provide a response for the request, the response comprising at least a portion of the image information in the image format.

DESCRIPTION OF THE PREFERRED EMBODIMENTS

The present invention, according to a preferred embodiment, overcomes problems with the prior art by simultaneously creating from an original image a set of available binary and text base vector graphic files for delivery to and presentation by particular networked devices. The invention efficiently selects the best image format for distribution of image information to the networked devices.

This invention is related to the deployment of visual information over a network such as the Internet or World Wide Web (WWW). However, other networks, such as a local area network or other types of wide area networks would likewise benefit from the advantages of the present invention.

The WWW is comprised of an expansive network of interconnected computers through which governments, business, organizations, and individual make information and resources available through shared files. Users connected to this network navigate and obtain this information by the use of a web browser. Information is gathered by the web browser and rendered for presentation to the user. Typically, the views produced consist of text and images laid out according to the Hypertext Markup Language (HTML) for personal computers and wireless protocols, such as Wireless Access Protocol (WAP), for mobile devices.

Images make up a large portion of the information presented to users through the WWW, and recent browsers provide several methods for defining this visual content. These methods can be broken down into two categories, binary encoding, and vector-based textual description. Binary images are broken down pixel by pixel and are translated into binary representation stored in a single file. Vector-based images take a different approach, describing an image by its characteristics rather than encoding it directly. Examples of binary encoded image formats include JPEG, GIF, and PNG. Examples of vector-based graphics include the Vector Markup Language (VML), Scalable Vector Graphics (SVG), and HTML Image Maps.

A preferred embodiment of the present invention proposes a system, method, and computer readable medium for creation of binary and vector-based images for distribution on a network. It also describes a method for determining the optimal image format for distribution over a network to a particular user, or client. The invention selects the optimal format in terms of speed of delivery and presentation, with minimal perceptible differences to the end user.

Users of the WWW desiring to attract people to their sites are constantly seeking ways to improve presentation and speed of access. A preferred embodiment of the present invention allows distributors of content on the web to combine the advantages of binary and vector-based images. It also ensures that images are distributed with optimum efficiency across the network. It additionally speeds the delivery of images while maintaining visual quality for the image information being presented at a networked device.

A preferred embodiment of the present invention combines two solutions, one solution comprises a programming tool for creating applications and corresponding image information, and the other solution comprises a determination algorithm, to solve the problems presented above.

An advantageous method is used to determine the type of graphical output format most appropriate for a particular session between a server of web content and a client networked device receiving that content. Although the present discussion illustrates using an exemplary client/server system arrangement, it should be obvious to those of ordinary skill in the art, in view of the present discussion, that other system arrangements will likewise utilize the advantages of the present invention. For example, any networked devices that communicate with an image information serving system would likewise benefit. Additionally, a peer-to-peer network topology would likewise benefit from the preferred embodiments of the present invention. Therefore, the use of the terms server and client in the present discussion shall be understood to cover all other such similar arrangements of image serving networked devices and image receiving networked devices.

The advantageous method analyzes factors including network speed, capabilities of the web browser (or user-agent), and any known properties of the capabilities of the system hosting the client's browser. The new method first determines which graphical formats the client is able to render. From those possibilities, it selects the format(s) that will provide the user with the optimal format determined from network transfer and rendering time and final display functionality. These formats are preferably communicated to an Application Programming Interface (API) for use in creating the images.

An API is a set of programming tools made available in a package to expand the available functionality of a programming environment. In the preferred embodiment of the present invention, an API is defined which offers methods for defining a two dimensional graphical object. The methods offered to the programmer by the API are independent of the graphical output format to be produced. The methods also allow the specification of information that is not entirely graphical in nature, such as textual descriptions or hyperlinks associated with a geometric region. When a method from the API is invoked, according to a preferred embodiment of the present invention, images are stored in memory buffers in binary or vector-based format and further the image format can be modified as selected by that method. Thus, a near identical image can be produced in multiple selectable output formats for distribution of image information.

The Architecture

In an exemplary system, a browsing device connected to a network such as the Internet makes a request to a web server for documents to display. This request, according to a preferred embodiment, also contains information about the browsing device making the request. The request from the browsing device is augmented with information known to the server but not part of the original request, such as user identification and session parameters. A preferred implementation of the invention stores information about network speed and client processing capabilities for each session between client and server. The final request sent to the web server, contains information identifying a document that a client networked device is requesting, as well as information about network status and client networked device capabilities for the active session.

Within the web server, the role of the response generator is to receive the request and send the appropriate requested content back to the client-networked device. The generator is an extension of the web server and can take the form of a Java Servlet, a CGI program, etc. The response generator separates the session parameters from the other data in the request and sends that session data to the determination proxy. The generator then takes the actions necessary to produce the content of the response. In the process of generating the response, it may become necessary to generate graphical content. In such a case, the generator sends a series of method calls that first define the visual content of the image and then makes a call to flush that output to the response. The generator then continues generating the rest of the response.

The determination proxy analyzes the session information passed to it from the response generator and informs the image server which formats are appropriate for the given request. The proxy does this by analyzing network connection speed, rendering capabilities of the client browser, processing capabilities and speeds of the client's network device, and other such factors given it from the response generator. In general, higher connection speeds with high processing capabilities will allow the highest quality image formats available, while lower connection speeds and processing capabilities will restrict the response to either solely vector-based images, or binary images of lower quality. The response generator also has the ability to influence the decision of the ultimate image output format by adding information to the session information that will influence its selection. The final determined output formats are passed via the graphic API.

The graphic API contains the programming tools and data structures necessary to create and output the various vector and binary based images. Methods within the API are called in order to define the visual and structural content of the images. The methods include calls such as draw_square, draw_image, etc. The methods also incorporate techniques for embedding meta-data about geometric sections of the image such as text-based descriptions or data links. Each method exists independent of the graphical output format so that the method may be applied to each format specified by the Determination Proxy.

Upon initial instantiation, the API creates image data buffers for each of the formats specified by the determination proxy. As method calls are made to the API, each image buffer is altered appropriately to reflect the call. For example the draw_square method would change the pixel values in a binary image such as in a JPEG or PNG buffer and it would add the coordinate description of a square to the buffer of a vector-based image such as in VML. When the response generator has completed the image content method calls, it makes a final call to flush the appropriate image buffers into the response.

The response is comprised of all data streams that are sent from the server to the client who made the original request. The response will include text and/or binary files representing both the image and non-image data generated from the response generator and graphic API.

By maintaining this programming API graphic generation, according to a preferred embodiment of the present invention, a content server allows for graphics to be converted and sent on the fly in response to parameters specified in the client's request. For example, a stock chart reflecting the most current stock prices, could be generated by the response generator. When appropriate for the session, a chart can be returned in binary form, vector form or a mix of both without additional manipulation of the response code.

While there are graphical conversion and creation application programs available that can save two dimensional graphic images in a variety of formats, there are no known programming tools available that allow simultaneous creation of both binary and vector-based images. There are also no known methods in use for determining optimal session-based graphical formats for distribution across a network, such as the Internet, which preferably take into account both binary and vector-based image formats.

On the other hand, a preferred embodiment of the present invention allows for delivery of image content over the Internet in a manner that is efficient and flexible. A high level summary of the sequence of steps taken by a preferred system to generate an image serving response to a client's request is as follows:

A request is received by the server, augmented with session data, and passed to the response generator.

The response generator sends session information to the determination proxy.

The determination proxy communicates to the graphic API which graphic formats are appropriate for generation.

The response generator generates the response. When an image needs to be created as part of the response, the response generator calls methods in the graphic API that define and output graphics and image information.

The server returns the response to the client.

DETAILS OF THE PREFERRED EMBODIMENTS

Adaptive Formatting and Image Serving

Figure 2:
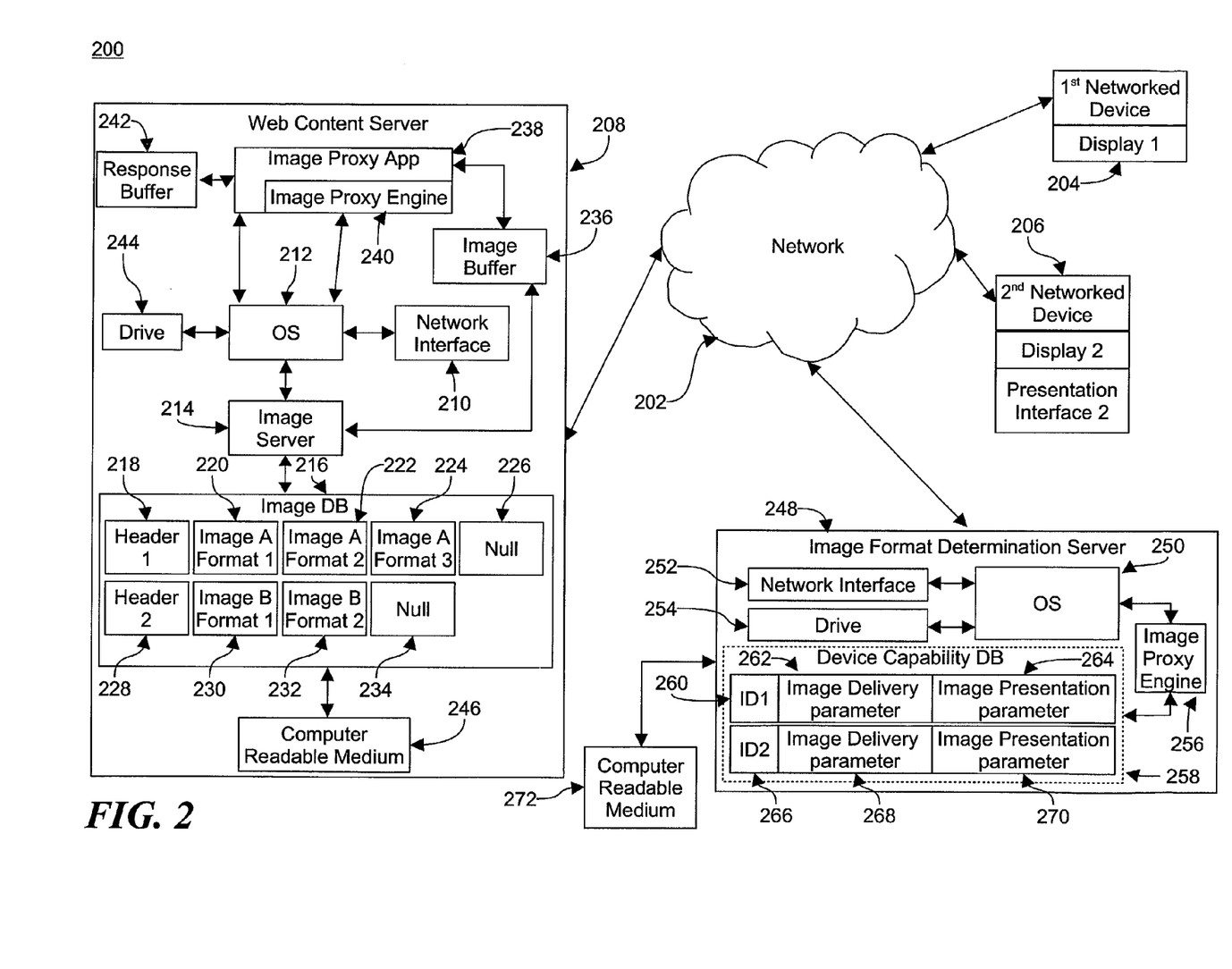
FIG. 2 is a block diagram illustrating an exemplary networked content distribution server system in accordance with a preferred embodiment of the present invention.

FIG. 2 illustrates an exemplary adaptive formatting and image serving system 200. Connected to a network 202, such as the Internet, is a first networked device 204 and display 1

205, and a second networked device 206, display 2 207 and a presentation interface 2 209. The presentation interface 209 represents such solutions as a printer, FAX, overhead project or similar. Also connected is an Image format determination server 248 and a web content server 208. Together these act in accordance with the subject invention.

The Web Content Server includes a network interface 210. The OS (Operating System) 212 controls the entire server 208. The Image Server 214 is running under the OS and works with the Image DB (Data Base) 216. The Database 216 contains two exemplary listings, which are taken to be two of many. The first entry, Header 1 218 represents the link list of all available image formats for Image A. They are Image A Format 1 220, Image A Format 2 222, Image A Format 3 224 and finally the end of field record, Null 226. The second entry, Header 2 228 represents the link list of all available image formats for Image B. They are Image B Format 1 230, Image B Format 2 232 and finally the end of field record, Null 234.

The selected format of the requested image is built in the Image buffer 236 by the image server 214. The image proxy application 238 and image proxy API engine 240 accomplishes a request for image information and obtaining the image information in the selected format in the image buffer 236. The response to a request from a networked client 204 is created in the response buffer 242. The server also has a drive 244 for non-volatile storage. The entire Web Content Server behavior can be contained on computer readable medium 246. Additionally, computer readable media 246 such as CD-ROM, Floppy, and other removable media can be used with a compatible drive 244 in the server 208. In this way, the functions and operations of the server 208 and the image information for the database can be updated.

The Image Format Determination Server 248 includes a list of known image delivery parameters stored in a capability database 258. The server 248 contains an OS 250, which in turn controls the network interface 252, a non-volatile storage drive 254 and the Image Proxy Engine 256. The Image Proxy Engine 256 operates with the capability database 258 to determine image format for a requested image information. Illustrated are two data base records, which represent many. ID1 260, lists image delivery parameters 262 and image presentation parameters 264 for a particular networked device. This represents a specific network and network connection speed, and the Image rendering capabilities of the particular client device. In a similar way ID2 266 lists specific image delivery parameters 268 and image presentation parameters 270 for another networked device client. The entire Image Format Determination Server behavior is contained on computer readable medium 272, such as CD-ROM, Floppy, and other removable media. The removable media can be used with a compatible drive 254 in the server 248. In this way, the functions and operations of the server 248 and the image information for the database can be updated.

When a networked device such as 204 sends a request for an image from the network 202 the image format determination server 248 receives the request. Additional information besides the requested image is passed along with the request. This information includes: networked device type, display capability, its connection type and quality. This information is used to access the device capability database 258. This database is used to assemble a list of possible image format types. Image formats that are not possible are not listed. This information is passed to the web content server 208. The list of possible image format types is sorted using a weighted set of parameters. These parameters include compatibility with the networked device, quality and time to render. This information is assembled in the Image database 216 and may be stored for future reuse, or assembled on the fly for each usage. The image proxy app 240 selects the best-fit image format from the image DB 216. The image proxy API 240 builds this image in the image buffer 236. This image is then served to the requesting network device 204 by the image server 214. This completes the image selection and serving process.

Alternative Version of an Adaptive Formatting and Image Serving System

Figure 3:
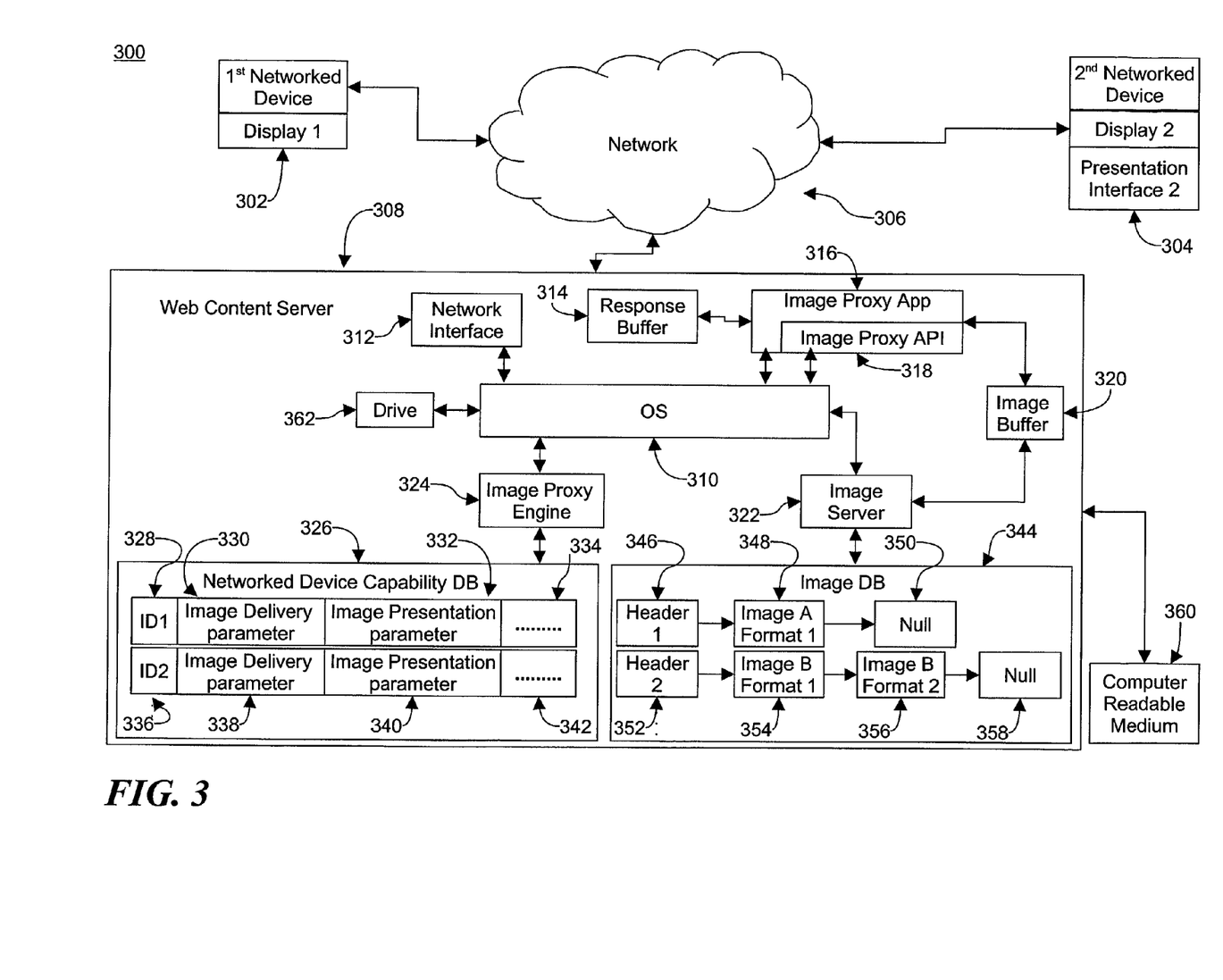
FIG. 3 is a block diagram illustrating an exemplary networked content distribution server system in accordance with an alternative preferred embodiment of the present invention.

FIG. 3 shows an alternative embodiment of an exemplary adaptive formatting and image serving system 300. Illustrated is a network such as the Internet 306. Connected to the network is a first networked device 302 with a display 303 of a particular presentation capability. A second networked device 304 is also connected to the network 306, which has a display 305 and a presentation interface 307. The presentation interface 307 represents such solutions as a printer, FAX, overhead project or similar output devices. Also connected to the network 306 is a web content server 308. This illustrates an alternative embodiment of the present invention. An OS 310 controls this server 308. The server's connection to the network 306 is performed via the network interface 312. The Image Proxy Application 316 and the Image Proxy API 318 respond to requests for image information from networked devices. This is accomplished by building an image in the image buffer 320. The image server 322 and the image proxy engine 324 accomplish this build. The response is created by the image proxy app 316 in the response buffer 314. The response is then delivered via the network interface 312 into the network 306 for distribution at the requesting networked devices.

The image proxy engine 324 accesses the networked device capability DB 326. The ID1 328, lists image delivery parameters 330 and image presentation parameters 332, and other related parameters 334. This record represents a specific network and network connection speed, and the Image rendering capabilities of a particular networked device client, such as for first networked device 302. In a similar way ID2 336 lists specific image delivery parameters 338 and image presentation parameters 340, and other related parameters 342 for another client such as fro the second networked device. These entries represent two of many.

The image server 322 accesses the image DB 344. The database contains two exemplary listings, which are taken to be two of many. The first entry, Header 1 346 represents the link list of all available image formats for Image A. They are Image A Format 1 348, and the end of field record, Null 350. The second entry, Header 2 352 represents the link list of all available image formats for Image B. They are Image B Format 1 354, Image B Format 2 356 and finally the end of field record, Null 358.

Flow Diagrams of the Device Database Update of the Image Proxy

Figure 4:
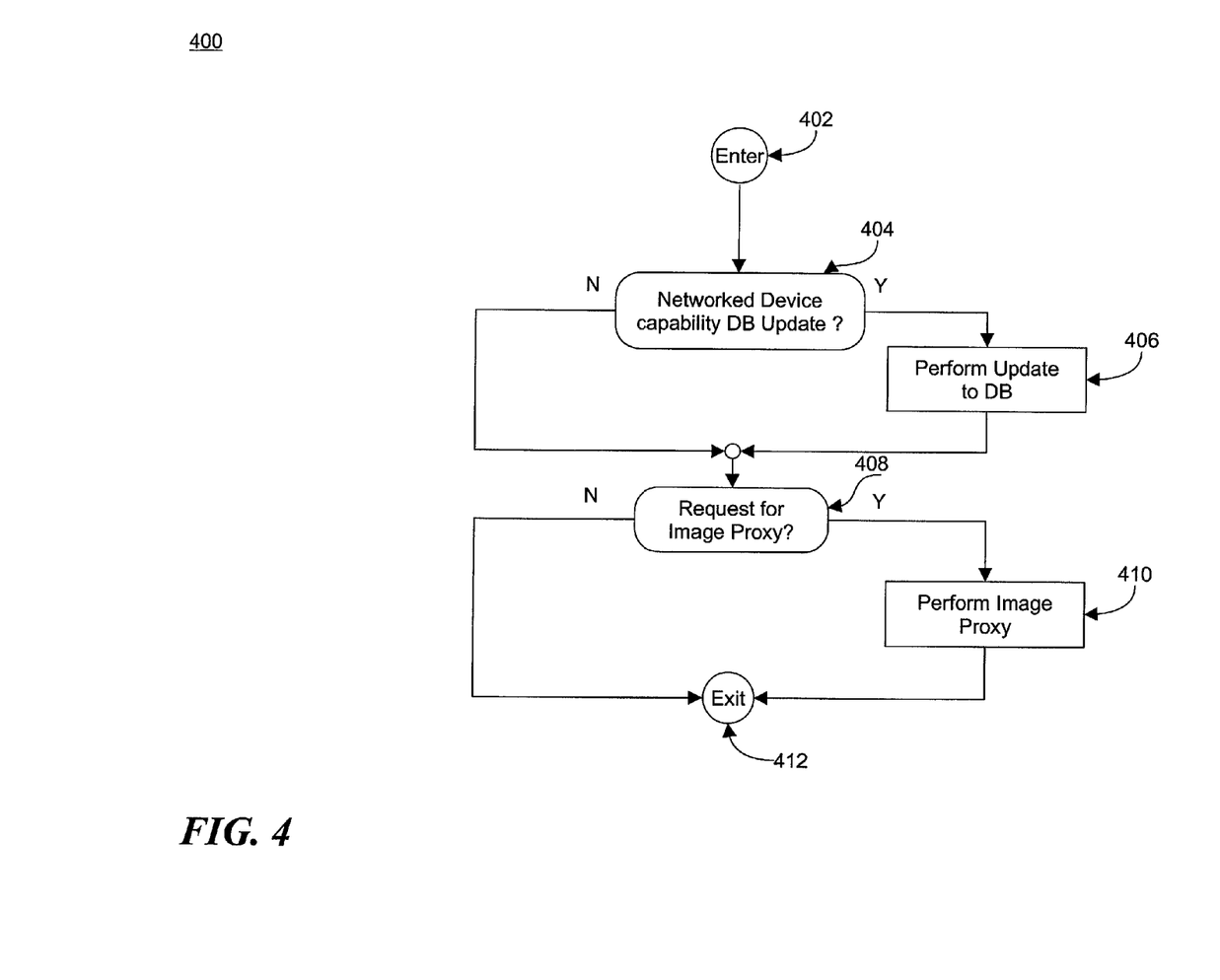
FIGS. 4, 5, and 6, are flow diagrams illustrating an exemplary operational flow sequence for an exemplary networked content distribution server system such as shown in FIG. 3, in accordance with a preferred embodiment of the present invention.
Figure 5:
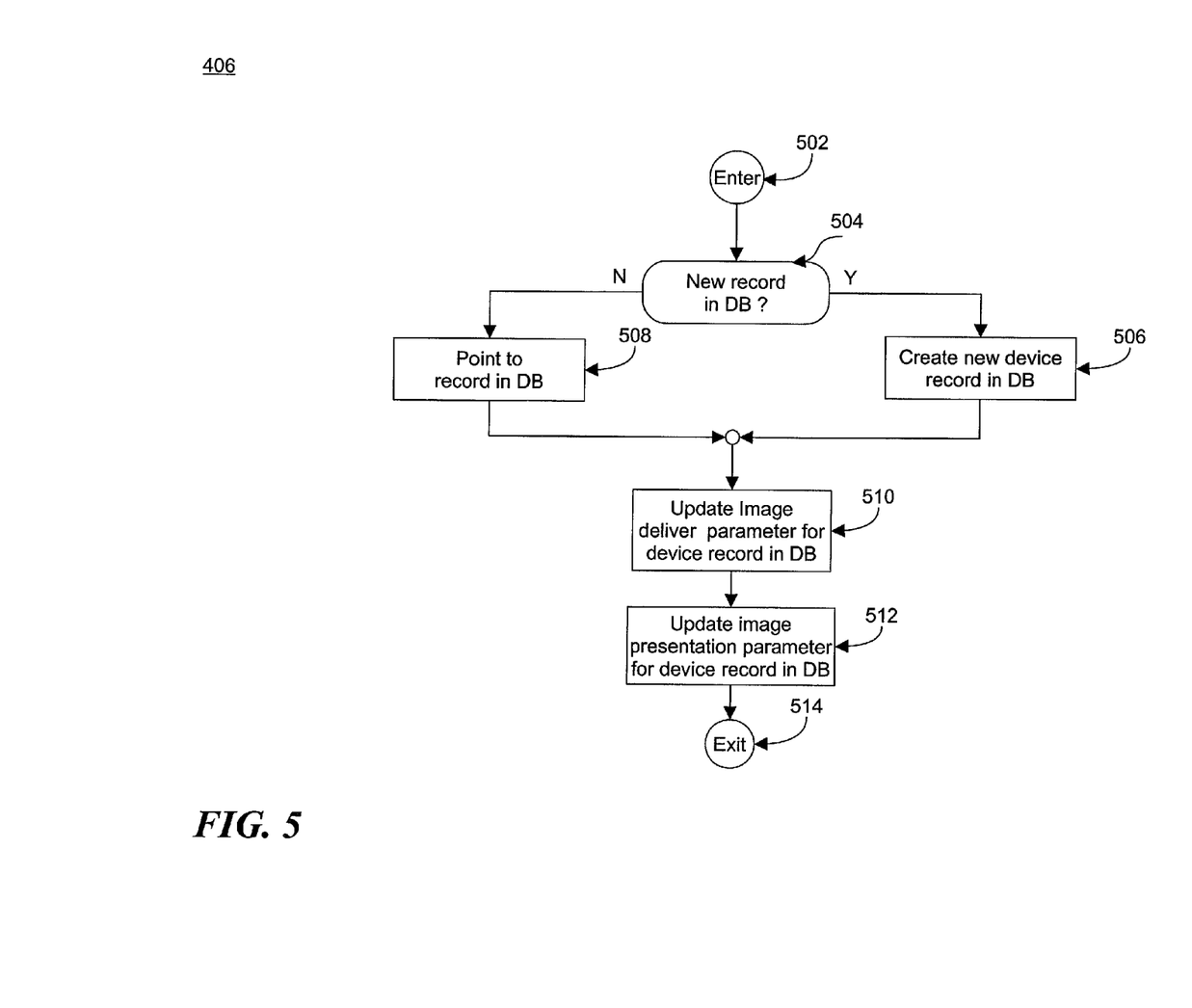
Figure 6:
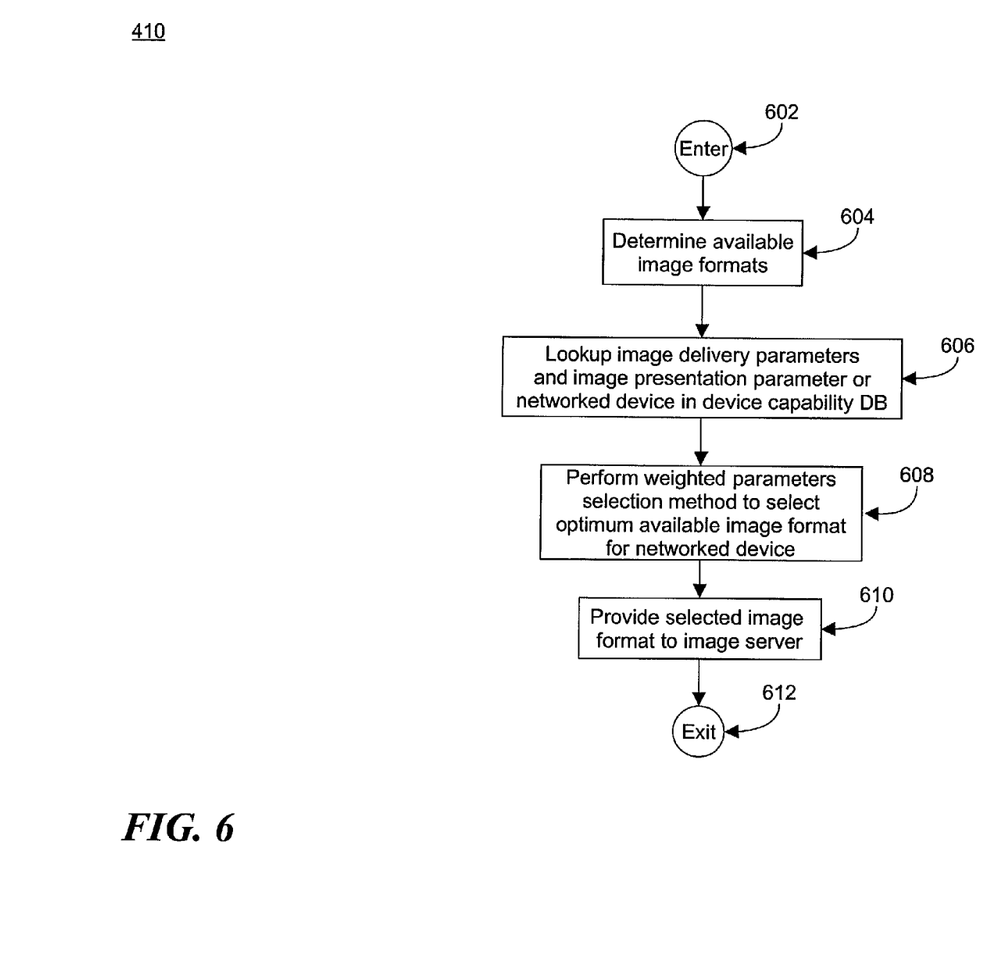

FIGS. 4, 5 and 6 illustrate an operational flow sequences from the server system 300. A client's communication to a content image server 208 is represented by the enter point 402. The client's capabilities are reviewed for updating the database if required 404. If the device is new to the system 300 or its capabilities have changed, the database 326 is updated 406. If no updates are required or after the update is completed, the server 208 checks whether a client is requesting an image proxy 408. If there is no request, or the image proxy is performed 410 the flow exits 412.

FIG. 5 shows a flow diagram 406 updating a record in the capability database 326. The flow starts at the enter point 502. A check is performed to see if the update requires that a new record is to be placed in database at step 504. If so, a new device record is created and placed in the database, 326 at step 506. If no new record is needed, then the server 308 points to the appropriate records in the database 326, at step 508 image delivery parameters for the device record. Then, the server 308 updates at step 512 image presentation parameters for the device record are placed in the database 512. The flow then exits at step 514.

FIG. 6 shows a flow diagram 410 selecting an appropriate image format for the image server 322. The request for an image enters the flow diagram at step 602. The available image formats may be found in the image header for a particular image format 604. The image server 322 sends a lookup request to the image proxy engine 320. The request includes the available image formats for a requested image and networked device identification information. The image proxy engine 324 performs a lookup, at step 606. The image proxy engine 320 receives the optimum available image format for the networked device 608. Finally, the selected image format is presented to the image server 322 and the flow is exited 612.

Image Serving by the Present Invention

Figure 7:
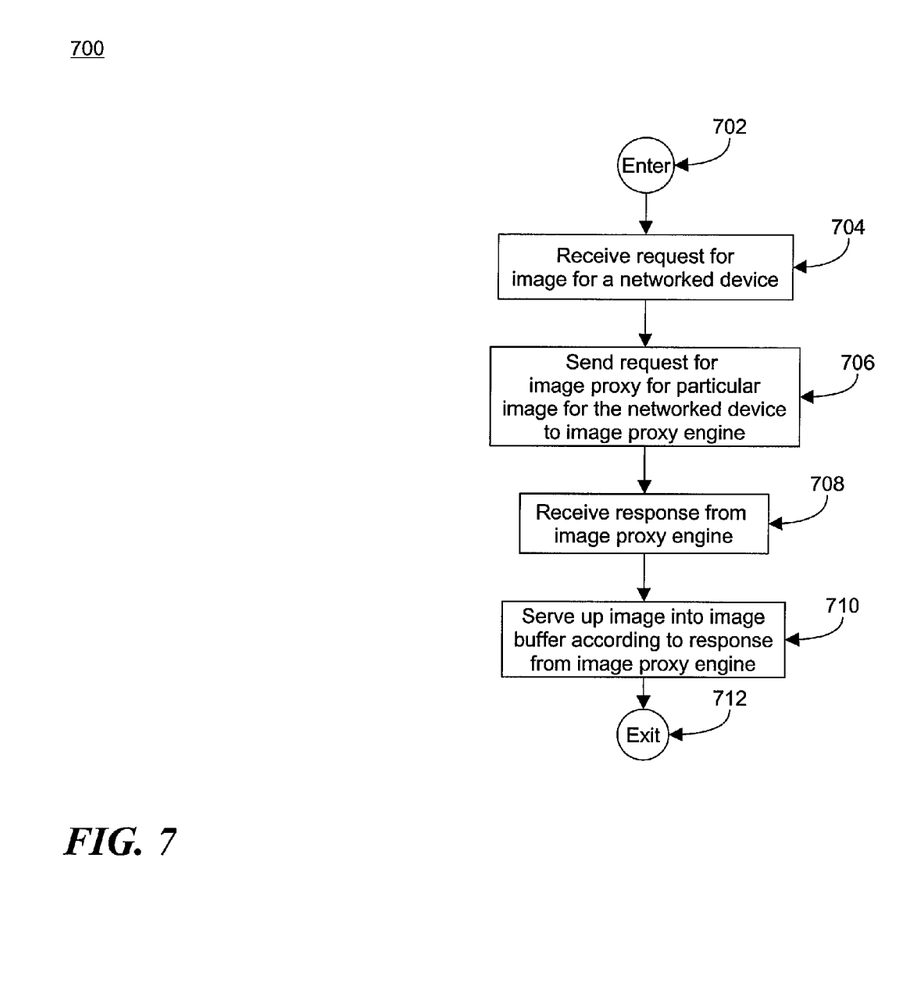
FIG. 7 is a flow diagram illustrating an exemplary operational sequence for a system such as shown in FIG. 2, according to a preferred embodiment of the present invention.

FIG. 7 shows a flow diagram 700. The flow is entered, at step 702, when the image server 214 receives a request to serve particular image information, at step 704, that is destined for reception and presentation by a particular networked device. The image server 214, at step 706, sends a query to the Image Format Determination Server 248 to determine an optimum image format for the particular image information to be delivered to, and presented by, the particular networked device. The image server 214 sends to the Image Format Determination Server 248, at step 706, the query that identifies the particular networked device and also the header information associated with the particular image information from the image DB 216. The image Proxy Engine 256 receives the query and follows the novel image format determination method, as has already been discussed above, in order to determine an optimum available format for the image information. The image Proxy Engine 256 applies the weighting factors to the capability parameters and to the corresponding available image formats for the particular image information. The image Proxy Engine 256 accordingly determines the optimum image format for the particular image information to be delivered to, and presented by, the particular networked device. The image Proxy Engine 256 then sends a response to the image server 214 to provide the determined optimum image format for the image information to the image server 214. The image server 214, at steps 708 and 710, receives the selected optimum image format and then serves up the particular image information in the optimum image format into the image buffer 236. Control is then handed back to the Image Proxy API 240 and the Image Proxy Application 238, and the flow diagram is exited, at step 712.

The Image Format Determination Server 248 has been described servicing one Web Content Server 208. Alternatively the Image Format Determination Server 248 can serve a plurality of Web Content Servers across a network, such as the Internet. Additionally, the locations and types of Web Content Servers that may operate with the single Image Format Determination Server 248 may be diverse. In this way, for example, the Image Format Determination Server 248 can be shared across many different content servers across the Internet. This provides significant cost savings for a system operator thereby enhancing the commercial viability of a content distribution system implementation.

In a distributed network approach, such as illustrated in FIG. 2, the Image Format Determination Server 248 would regularly receive updates to the capability database 258 via the network 202. According to one preferred embodiment, web content servers 208 would receive communications with networked devices 204, 206, and collect capability information corresponding to the networked devices 204, 206. For example, as the first networked device 204 accesses the network 202 from varying communication links, the changes in communication capability can be monitored by the web content server's 208 and updated to the capability database 258 in the Image Format Determination Server 248. The image server 214, for example, would send an update message to the image proxy engine 256. The image proxy engine 256 would then accordingly update the capability database 258. Similarly, if a new presentation resource (e.g. a new display system) is being used in the first networked device 204, for example, then the image server 214 would send an update to the image proxy engine 256 to update accordingly the capability record corresponding to the first networked device 204, as stored in the capability database 258.

Creation of Image Records According to the Present Invention

Figure 8:
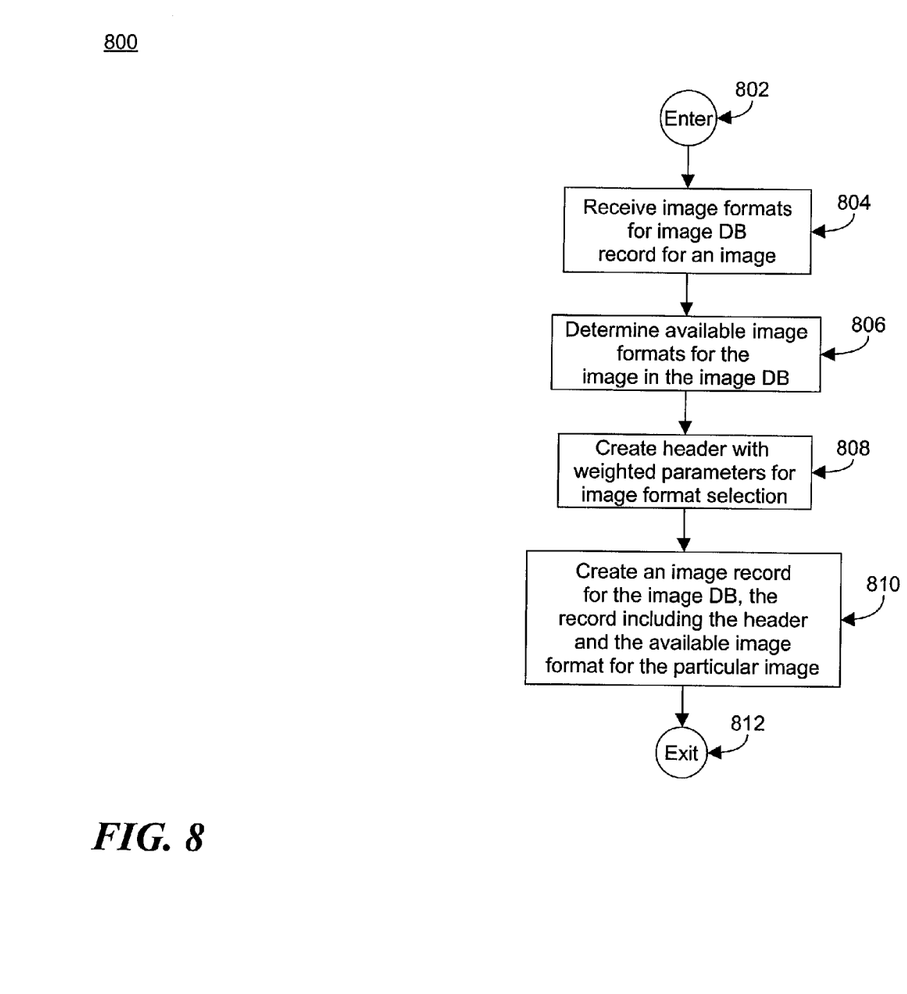
FIG. 8 is a flow diagram illustrating an exemplary operational sequence for creating image information for an exemplary server system such as shown in FIGS. 2 and 3, according to preferred embodiments of the present invention.

FIG. 8 shows a flow diagram 800 illustrating an exemplary operational sequence for creation of image proxy applications 238 (such as shown in FIG. 2) and corresponding image records 218, 228, for the Image DB 216 and the web content server 208. Note that although the discussion below will refer to FIG. 2, the exemplary operational sequence similarly applies to the creation of image proxy applications 316, as shown in FIG. 3, and the corresponding image records 346, 352, for the image database 344 in the web content server 308. This exemplary operational sequence can be followed, for example, by a computer system (not shown) used as a development workstation. The development system can be standalone or can be networked and can even be in network communication coupling with the web content server 208 to deliver image proxy applications 238 and corresponding image records 218, 228, to the web content server 208. A software developer, for example, would use software development tools to create the image proxy application 238 and to embed therein the Image Proxy API 240, such as including code and data for use by the image proxy application 238 to communicate with the image server 214 as described above with respect to the preferred embodiments.

The flow is entered, at step 802, when, according to one preferred embodiment, a development system receives, at step 804, at least one image format corresponding to an image for storing in an image record 218, 228, in the Image Database 216. Typically, the developer of the image proxy application 238 will have control over the selection of image information for use with the image proxy application 238, and the developer will additionally have control over the typical available image formats for the particular image information for the image proxy application 238.

Then, at step 806, a development system preferably determines all available image formats for the image information. This set of all available image formats may be greater than, or less than, the set of typical image formats that the author and/or developer of the image proxy application 238 selected at step 804. This set of all available image formats is indicated in the header information in the image record 218, 228, and each image format constitutes an entry in the linked list of image formats associated in the image record 218, 228. This process results in, at step 808, the creation of a header with weighted parameters for the image format selection. Finally, at step 810, the image record for the Image DB, the record including the header and the available image formats for the particular image is created. This image record is then ready to be stored in the Image Database 216. The flow is exited at step 812.

Note that the image record may store a linked list of available image formats, where the items in the linked list are descriptions of the image formats for the image server 214, in the content server 208, to create a final image information in a determined optimum image format when requested by the image proxy application 238 via the image proxy API 240. Alternatively, the available image formats stored in the linked list may comprise actual image information in the particular image format for an item of the linked list. In this way, in response to a request for image information via the image proxy API 240, the image server 214 serves up the determined image information in the optimum image format directly from the image record in the database with reduced processing requirements. It should be obvious to one of ordinary skill in the art from the discussion above that an embodiment of the present invention can trade-off storage memory requirements for operational processing requirements and response time. A web content server 208 implementation, advantageously, can balance between storage requirements for an image database 216 and the processing requirements of the image server 214 by serving the image information in a determined optimum image format. This is accomplished by storing pre-assembled image information in the particular image formats in the image record DB 216. This will increase the storage memory requirements, but assure fast image server response time with little operational processing required. This trade-off can be implemented, according to one preferred embodiment, into the database record 218, 228, for particular image information when created by the developer of an image proxy application 238.

The created image records 218, 228, and the created image proxy application 238, can then be written to a non-volatile computer readable storage medium 246 such as a CD-ROM. This non-volatile computer readable storage medium 246 can then be used to distribute the image proxy application 238 and corresponding image records 218, 228, to Web Content Servers 208. The non-volatile computer readable storage medium 246 would be readable using, for example, the drive 244 of the Web Content Servers 208.

Figure 9:
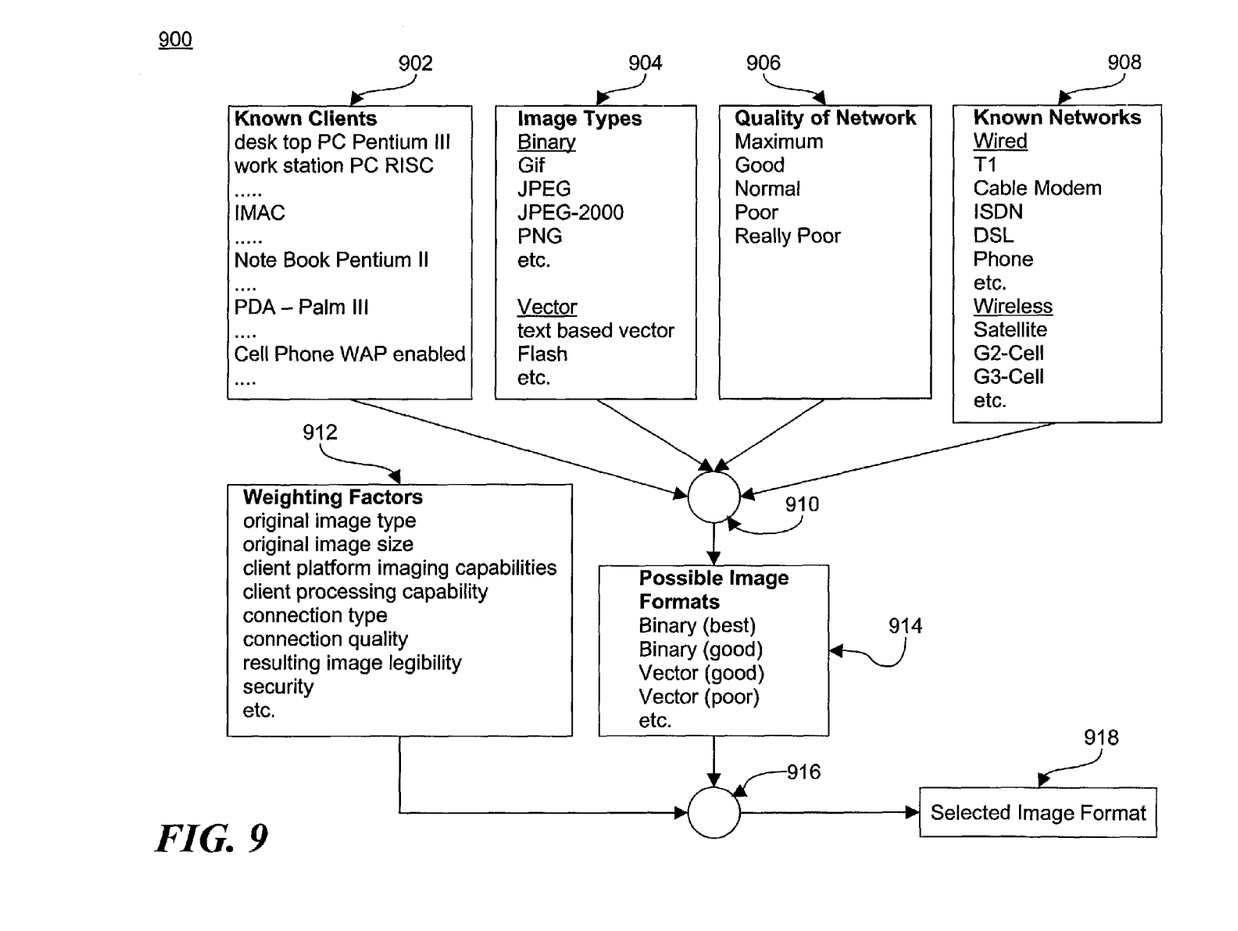
FIG. 9 is a diagram illustrating several tables of information containing examples of the client's processing and imaging capabilities and the interconnection speed, with which an optimum image for a given request is built and served.

Examples of Tables Used for Image Translation FIG. 9 contains a view of exemplary tables with which the image proxy engine 256 responds to requests for images. Table 902 contains all known client types and their variations and their compatibility with certain image file formats. This table 902 would preferably be stored, in the preferred embodiment shown in FIG. 2, in memory in the Image Format Determination Server 248. Examples of table entries would include the ability to work with text-based vectors and the display format size. Table 904 contains the known image types and their APIs for converting from one image format to another. These APIs would preferably be stored in the Web Content Server 208. Examples would be the conversion from a high quality JPEG to a text based vector image. It is noted that not all conversions are possible, or legible if converted. Table 906 contains a list of weighting factors for different network connections. These factors would be stored in memory in the Image Format Determination Server 248. These parameters represent the communication bandwidth that a networked client device is currently communicating with, and they determine the amount of time that an image would take to be communicated to the networked client device. Table 908 contains a list of both wired and wireless network types and their associated typical bandwidths. These factors would also be stored in memory in the Image Format Determination Server 248. The network type is influenced by the quality of the network 906. This qualification of a network type by the network quality parameter adjusts weighting factors associated with the network type to better characterize the likely communication throughput for delivering image information to the particular networked client device. In an example, a client may have a 56 kb modem capability but actually be connected with a bandwidth of only 28 Kb.

Taken together at the decision node 910, the tables 902, 904, 906 and 908, as discussed above, are used to build a table 914, which lists all available file formats for a requested image. This table of listed formats is assembled in the Web Content Server 208 within the Image DB 216. Once this table 914 is completed, the table 912 that contains the weighting factors is used to select 916 from the table 914 the one optimum image format for delivery to, and presentation by, the particular networked client device. This table of Weighting Factors 912, preferably resides in the Web Content Server 208. This selected image format 918 is then used to assemble the image in the Image Buffer 236 for the image proxy application 238 to use in creating information in a response buffer 242 to be sent back to the requesting networked client device by the Web Content Server 208. The image proxy application 238, for example, would send the response information to the network interface 210 for delivery into the network 202 destined for reception by the particular requesting networked client device.

Discussion of Image Serving Realization

The present invention can be realized in hardware, software, or a combination of hardware and software. A content server, as illustrated in FIGS. 2 & 3, according to the preferred embodiments of the present invention, can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context means any expression, in any language, code or notation, of a set of instructions intended to cause a system having an information processing capability to perform a particular function either directly or after either or both of the following: a) conversion to another language, code or, notation; and b) reproduction in a different material form.

Each computer system may include, inter alia, one or more computers and at least one computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
receiving a request that includes a request for delivery of image information to a networked device and session information pertaining to a current communication session between the networked device and a server, the session information being separate from the request for delivery of image information;
determining, by at least one server within a network, based on an image delivery parameter and an image presentation parameter associated with the networked device, an image format for the image information for delivery of the image information to the networked device and for presentation of the image information at the networked device, the image delivery parameter and the image presentation parameter associated with the networked device being contained in the session information; and
providing a response for the request, the response comprising at least a portion of the image information in the image format.

2. A non-transitory computer readable medium including computer instructions for an image server system, the computer instructions comprising instructions for:
receiving a request that includes a request for delivery of image information to a networked device and session information pertaining to the current communication session between the networked device and a server, the session information being separate from the request for delivery of image information;
determining, by at least one server within a network, based on an image delivery parameter and an image presentation parameter associated with the networked device, an image format for the image information for delivery of the image information to the networked device and for presentation of the image information at the networked device, the image delivery parameter and the image presentation parameter associated with the networked device being contained in the session information; and
providing a response for the request, the response comprising at least a portion of the image information in the image format.

3. A content server system comprising:
a first memory for storing at least one of an image delivery parameter and an image presentation parameter associated with a networked device;
a network interface for communicating with a network;
a controller, communicatively coupled to the first memory and to the network interface; and
a second memory, communicatively coupled to the controller, for storing computer instructions for the controller to control the content server system to:
receiving a request that includes a request for delivery of image information to a networked device and session information pertaining to the current communication session between the networked device and a server, the session information being separate from the request for delivery of image information;
determining, by at least one server within a network, based on an image delivery parameter and an image presentation parameter associated with the networked device, an image format for the image information for delivery of the image information to the networked device and for presentation of the image information at the networked device, the image delivery parameter and the image presentation parameter associated with the networked device being contained in the session information; and
providing a response for the request, the response comprising at least a portion of the image information in the image format.

4. The content server system of claim 3, wherein the second memory includes cormputer instruction for the controller to control the server system to:
couple the response to the network interface, the response being destined for reception by the networked device.

5. The content server system of claim 3, wherein the second memory includes computer instruction for the controller to control the server system to:
receive, along with the request, the at least one of the image delivery parameter and the image presentation parameter associated with the networked device; and
store the at least one of the image delivery parameter and the image presentation parameter in the first memory.

6. The content server system of claim 5, wherein the program memory includes computer instruction for the controller to control the server system to:
receive the request from one of the networked device and another requester device.

7. A method comprising the steps of:
receiving a request that includes a request for delivery of image information to a networked client device and session information pertaining to the current communication session between the networked device and a server, the session information being separate from the request for delivery of image information; and
determining, by at least one server within a network, an image format for the image information from an image delivery parameter and an image presentation parameter associated with the networked client device, the image delivery parameter and the image presentation parameter associated with the networked device being contained in the session information.

8. The method of claim 7, wherein the determining is performed with a proxy server that is separate and remote across the network from the server.

9. A non-transitory computer readable medium including computer instructions for:
receiving a request that includes a request for delivery of image information to a networked client device and session information pertaining to the current communication session between the networked device and a server, the session information being separate from the request for delivery of image information; and determining, by at least one server within a network an image format for the image information from an image delivery parameter and an image presentation parameter associated with the networked client device, the image delivery parameter and the image presentation parameter associated with the networked device being contained in the session information.

10. The computer readable medium of claim 9, wherein the computer instructions further include instructions for prdviding a response for the request, the response comprising at least a portion of the image information in the image format.

11. A method comprising the steps of:
storing an image delivery parameter and an image presentation parameter associated with a networked device;

receiving a request that includes a request for delivery of displayable image information to the networked device and session information pertaining to a current communication session between the networked device and a server, the session information being separate from the request for delivery of, the displayable image information;

determining, by at least one sender within a network, available image formats for the displayable image information; and selecting one of the available image formats, based at least in part on the image delivery parameter and the image presentation parameter, for delivery to and presentation at the networked device, the image delivery parameter and the image presentation parameter associated with the networked device being contained in the session information.

12. The method of claim 11, further comprising the steps of:

building a file comprising at least a portion of the displayable image information in the selected one of the available image formats; and sending the file to a network interface, the file being destined for reception by the networked device.

13. A system comprising:

at least one networked device; and a content server for delivering content information comprising image information to the at least one networked device, the content server including:

a first memory for storing an image delivery parameter and an image presentation parameter associated with a networked device;

a network interface for communicating with a network link communicatively coupled with the at least one networked device;

a controller, communicatively coupled to the first memory and to the network interface; and a second memory, communicatively coupled to the controller, for storing computer instructions for the controller to control the content server for:

receiving a request that includes a request for delivery of content information to the at least one networked device and session information pertaining to a current communication session between the networked device and a server, the session information being separate from the request for delivery of the content information comprising image information; and determining, by at least one server within a network, based on the image delivery parameter and the image presentation parameter associated with the at least one networked device, an image format for the image information for delivery of the image information to the at least one networked device and for presentation of the image information at the at least one networked device, the image delivery parameter and the image presentation parameter associated with the networked device being contained in the session information.

14. The system of claim 13, wherein the determining is performed with a proxy server that is separate and remote across the network from the content server.

15. The system of claim 13, wherein the first memory comprises a first database for storing records containing image delivery parameters and image presentation parameters associated with the at least one networked device, and a second database for storing at least one image record, the at least one image record containing;

an image header for at least identifying an image and identifying at least one available image format in the image record, and image information formatted in the at least one available image format.

16. The system of claim 13, wherein the controller uses Application Programming Interface (API) calls to request at least the determination, based on at least one of an image delivery parameter and an image presentation parameter associated with the at least one networked device, an image format for the image information.

17. The system of claim 16, further comprising an image server, responsive to the API calls, for serving up the image information in the determined image format.

18. The system, of claim 16, further comprising an image proxy engine, responsive to the API calls, for determining, based on at least one of an image delivery parameter and an image presentation parameter associated with the at least one networked device, the image format for the image information.

19. The system of claim 13, wherein the determined image format is selected from a set of image formats including binary bitmap and vector based graphics.

20. The system of claim 13, wherein the determined image format is selected from a set of image formats including JPEG, GIF, TIFF, JPEG 2000, VML, and WAVELETS.

21. The system of claim 13, wherein the image delivery parameter corresponds to at least one network communication link type of the following link types: T-1, DSL, CABLE, POTS, CELLULAR, PAGING, SATELLITE, RADIO, and WIRELESS.

22. The system of claim 13, wherein the image presentation parameter corresponds to at least one presentation platform type of the following types: PC-like, Mac-like, Desktop Workstation, Laptop, Handheld, Notebook, Palm-like, Cellular Phone, Cordless Phone, Two-Way Pager, and PDA.

* * * * *